(12) United States Patent
Koyama et al.

(10) Patent No.: US 9,856,397 B2
(45) Date of Patent: Jan. 2, 2018

(54) METHOD FOR FORMING A MULTILAYER COATED FILM

(71) Applicants: BASF Coatings GmbH, Münster (DE); Nissan Motor Co. Ltd., Yokohama-shi, Kanagawa (JP)

(72) Inventors: Yohei Koyama, Kanagawa (JP); Yasufumi Honda, Yokohama (JP); Souichi Mori, Kanagawa (JP); Hisayuki Nakashima, Kanagawa (JP); Hironori Tsutsui, Yokohama (JP)

(73) Assignees: BASF Coatings GmbH, Münster (DE); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/785,143

(22) PCT Filed: Apr. 9, 2014

(86) PCT No.: PCT/EP2014/000941
§ 371 (c)(1),
(2) Date: Oct. 16, 2015

(87) PCT Pub. No.: WO2014/169996
PCT Pub. Date: Oct. 23, 2014

(65) Prior Publication Data
US 2016/0083617 A1    Mar. 24, 2016

(30) Foreign Application Priority Data

Apr. 17, 2013 (JP) ................................. 2013-086876

(51) Int. Cl.
*C09D 175/04* (2006.01)
*B05D 7/00* (2006.01)
*C09D 167/02* (2006.01)
*B05D 3/00* (2006.01)

(52) U.S. Cl.
CPC ........... *C09D 175/04* (2013.01); *B05D 3/007* (2013.01); *B05D 7/572* (2013.01); *C09D 167/02* (2013.01)

(58) Field of Classification Search
CPC ...... B05D 3/007; B05D 7/572; C09D 167/02; C09D 175/04; Y10T 428/31551; Y10T 428/31554
USPC ...... 428/423.1, 423.3; 427/388.4, 409, 427.5
See application file for complete search history.

(56) References Cited

U.S. PATENT DOCUMENTS

| 6,770,702 | B1 * | 8/2004 | Muller ................. C08F 265/04 524/507 |
| 9,017,768 | B2 | 4/2015 | Tomizaki et al. |
| 2004/0214942 | A1 * | 10/2004 | Huybrechts ........ C08G 18/6229 524/507 |

FOREIGN PATENT DOCUMENTS

| EP | 1477236 | 11/2004 |
| JP | 2007-297545 | 11/2007 |
| JP | 2011-525415 | 9/2011 |
| WO | WO-00/35600 | 6/2000 |
| WO | WO-2013/027093 | 2/2013 |

OTHER PUBLICATIONS

PCT International Preliminary Report on Patentability in PCT/EP2014/000941, dated Oct. 20, 2015, 8 pages.
PCT International Search Report and Written Opinion in PCT/EP2014/000941, dated Jul. 23, 2014, 4 pages.

* cited by examiner

*Primary Examiner* — Thao T Tran
(74) *Attorney, Agent, or Firm* — Servilla Whitney LLC

(57) ABSTRACT

An multilayer coated film comprises a waterborne intermediate-coat coating material and a waterborne basecoat coating material both containing a core/shell type resin emulsion (A) in which the core portion is an acrylic resin (A1) and the shell portion is a polyurethane resin (A2), a water-soluble or water-dispersible polyurethane resin (B), a water-soluble or water-dispersible polyester resin (C), and a melamine resin (D), and, based on the combined resin solids content by mass of aforesaid components (A) to (C), the solids content by mass of component (A) is 5-25 mass %, the solids content by mass of component (B) is 45-65 mass %, the solids content by mass of component (C) is 20-40 mass %, and the solids content by mass of component (D) is 35-45 mass %.

4 Claims, No Drawings

METHOD FOR FORMING A MULTILAYER COATED FILM

CROSS-REFERENCE TO RELATED APPLICATIONS

This application is the National Stage entry of PCT/EP2014/000941, filed on Apr. 9, 2014, which claims priority to Japanese Application Number 2013-086876, filed on Apr. 17, 2013, which are incorporated herein by reference in their entireties.

TECHNICAL FIELD

The present invention relates to a novel multilayer coated film forming method which can be utilized in various fields, in particular in the field of automobile coating.

BACKGROUND ART

Generally speaking, in the case where an automobile body constitutes the object being coated, the formation of a multilayer coated film is carried out by a method in which an electrodeposited coat is first formed on the object being coated and then heating and hardening carried out, after which a multilayer coated film comprising an intermediate coat, a basecoat and a clearcoat are formed. Currently, waterborne coating materials are being employed as the intermediate and basecoat coating materials in order to reduce the use of volatile organic compounds (VOC).

In recent years, from the point of view of saving energy, a method for forming the multilayer coated film by means of a so-called 3-coat 1-bake (3C1B) system has begun to be adopted where, instead of applying the intermediate-coat coating material onto the electrodeposited coat (the electrocoat) to form the intermediate coat and then subjecting this intermediate coat to heating and hardening, the basecoat and the clearcoat are formed on the intermediate coat after this has undergone low-temperature drying (flash-off), and then these three coats are subjected to simultaneous heating and hardening.

With regard to the method of forming a multilayer coated film by the 3C1B system, in Patent Document 1 there is disclosed a method for forming a multilayer coated film by the 3C1B system using a first waterborne coating material, a second waterborne coating material and a clearcoat coating material where, in said method for forming a multilayer coated film, by including in the second waterborne coating material an emulsion resin having a core/shell structure which is obtained by the emulsion polymerization of a specified vinyl monomer mixture, and also including a urethane emulsion, etc., there is obtained a multilayer coated film which is excellent in its external appearance and water resistance.

Furthermore, in Patent Document 2 there is disclosed a method for forming a multilayer coated film by the 3C1B system using a waterborne first colored coating material, a waterborne second colored coating material and a clearcoat coating material where, in said method, by including in the waterborne first colored coating material a specified hydroxyl group-containing polyester resin, and a water-dispersible acrylic resin having a core/shell structure obtained by the polymerization of specified monomer components, etc., there is formed a multilayer coated film which is outstanding in terms of smoothness and image clarity.

However, in the methods for forming a multilayer coated film by the 3C1B system described in aforesaid Patent Documents 1 and 2, when flash-off is omitted following the formation of the intermediate coat in order to achieve still greater energy savings, layer mixing occurs between the intermediate coat and the basecoat, and a satisfactory coated film external appearance is not obtained.

PRIOR ART LITERATURE

Patent Literature

[Patent Document 1] JP-A-2007-297545
[Patent Document 2] Tokuhyō 2011-525415

OUTLINE OF THE INVENTION

Problem to be Solved by the Invention

The present invention aims to provide a method for forming a multilayer coated film by the 3C1B system where, in said method for forming a multilayer coated film, even in the case where the intermediate coat is formed by application of a waterborne intermediate-coat coating material and then the waterborne basecoat coating material applied onto said intermediate coat without performing flash-off, it is possible to obtain a multilayer coated film which, as well as having an outstanding coated film external appearance, is also outstanding in its chipping resistance and coated film hardness, and, furthermore, satisfies the coated film performance demanded of an automobile exterior coated film in terms of scratch resistance, water resistance and acid resistance, etc.

Means for Solving the Problem

As a result of painstaking research aimed at solving the above problem, the present inventors have discovered that this problem can be solved by the use, both as the waterborne intermediate coating material and the waterborne basecoat coating material, of a core/shell type resin emulsion which comprises a core portion of acrylic resin and a shell portion of polyurethane resin and which has specified property values, along with a water-soluble or water-dispersible polyurethane resin, a water-soluble or water-dispersible polyester resin, and a melamine resin, at specified solids content mass ratios, and the present invention has been perfected based on this discovery.

Specifically, the present invention relates to a multilayer coated film forming method which includes an intermediate coat formation step in which a waterborne intermediate-coat coating material is coated onto an electrodeposited and hardened coated film to form the intermediate coat, a basecoat formation step in which a waterborne basecoat coating material is coated onto the intermediate coat to form the basecoat without performing flash-off following the intermediate coat formation step, a clearcoat formation step in which a clearcoat coating material is coated onto the unhardened said basecoat to form the clearcoat, and a heating and hardening step in which these three coats are simultaneously heated and hardened, where, in said multilayer coated film forming method, the aforesaid waterborne intermediate-coat coating material and the aforesaid waterborne basecoat coating material include a core/shell type resin emulsion (A) in which the core portion is an acrylic resin (A1) and the shell portion is a polyurethane resin (A2), a water-soluble or water-dispersible polyurethane resin (B), a water-soluble or water-dispersible polyester resin (C), and a melamine resin (D), and the hydroxyl value of aforesaid acrylic resin (A1) is 10-30 mgKOH/g, the acid value is 0-10 mgKOH/g, and the glass transition temperature is 0-100° C., the hydroxyl value of aforesaid polyurethane resin (A2) is 20-80 mgKOH/g, the acid value is 10-60 mgKOH/g, and the number average molecular weight is 2,000-10,000, the solids content mass ratio denoted by {aforesaid component (A1)/aforesaid component (A2)} is 0.80-1.25, and, based on the combined resin solids contents by mass of aforesaid components (A) to (C), the solids content by mass of aforesaid component (A) is 5-25 mass %, the solids content by mass of aforesaid component (B) is 45-65 mass %, the solids content by mass of aforesaid component (C) is 20-40 mass %, and the solids content by mass of aforesaid component (D) is 35-45 mass %. Reference to the combined resin solids content by mass of aforesaid components (A) to (C) means the combined total of the resin solids content by mass of component (A), the resin solids content by mass of component (B), and the resin solids content by mass of component (C).

Furthermore, the present invention also relates to a multilayer coated film forming method where, in the above multilayer coated film forming method, the clearcoat coating material is a clearcoat coating material containing acrylic resin and polyisocyanate compound, wherein said acrylic resin has structural units (a) based on ε-caprolactone and structural units (b) based on radically-polymerizable monomer having a ring structure, and the contained proportion of structural units (a) based on ε-caprolactone is at least 15 mass % of the aforesaid acrylic resin solids content, and the contained proportion by mass of structural units (b) based on radically-polymerizable monomer having a ring structure is 50-100 mass % in terms of the structural units (a) based on ε-caprolactone.

Moreover, the present invention also relates to coated films formed by the above multilayer coated film forming methods.

Effects of the Invention

In the multilayer coated film forming method of the present invention, even in the case where the waterborne basecoat coating material is coated onto the intermediate coat without first performing flash-off following the application of the waterborne intermediate-coat coating material to form the intermediate coat, it is possible to obtain a multilayer coated film which has an outstanding coated film external appearance and is outstanding in its chipping resistance and coated film hardness, and which also satisfies the coated film performance demanded of an automobile exterior coated film in terms of scratch resistance, water resistance, and acid resistance, etc.

MODE OF PRACTICING THE INVENTION

The waterborne intermediate-coat coating material and the waterborne basecoat coating material employed in the multilayer coated film forming method of the present invention each contain a core/shell type resin emulsion (A) in which the core portion comprises acrylic resin (A1) and the shell portion comprises polyurethane resin (A2), together with water-soluble or water-dispersible polyurethane resin (B), water-soluble or water-dispersible polyester resin (C), and melamine resin (D).

The aforesaid core/shell type resin emulsion (A) in which the core portion comprises acrylic resin (A1) and the shell portion comprises polyurethane resin (A2) consists of a resin, in which the core portion comprises acrylic resin (A1) and the shell portion comprises polyurethane resin (A2), dispersed in an aqueous medium to form an emulsion state. Examples of the aqueous medium include deionized water, pure water, and the like, and said aqueous medium may also include a small amount of organic solvent.

The core/shell type resin emulsion (A) in which the core portion comprises acrylic resin (A1) and the shell portion comprises polyurethane resin (A2) is obtained by synthesizing acrylic resin (A1), which forms the core portion, by the polymerization of polymerizable monomer which includes acrylic monomer in an aqueous solution or aqueous dispersion of polyurethane resin (A2), which forms the shell portion.

Polyurethane resin (A2), which forms the shell portion of core/shell type resin emulsion (A), can be obtained by a known method using polyol, dimethylolalkanoic acid, polyisocyanate compound, and polyhydric alcohol as starting material components.

As examples of the polyol employed in the synthesis of said polyurethane resin (A2), there are polyester polyols, polyether polyols, and polycarbonate polyols, but polyester polyols are preferred in terms of chipping resistance.

Polyester polyols can be obtained by known methods which employ an esterification reaction using a polybasic acid and a polyhydric alcohol as the starting material components.

Normally, a polycarboxylic acid is used as the polybasic acid starting material component of the polyester polyol but, where required, a monobasic fatty acid, or the like, may also be jointly employed. Examples of the polycarboxylic acid include phthalic acid, isophthalic acid, terephthalic acid, tetrahydrophthalic acid, tetrahydroisophthalic acid, hexahydrophthalic acid, hexahydroterephthalic acid, trimellitic acid, pyromellitic acid, and other such aromatic polycarboxylic acids, adipic acid, sebacic acid, succinic acid, azelaic acid, fumaric acid, maleic acid, itaconic acid, and other such aliphatic polycarboxylic acids, as well as the anhydrides thereof. These polybasic acids may be used singly, or it is possible to employ combinations of two or more thereof.

Examples of the polyhydric alcohol starting material component of the polyester polyol, and, likewise, examples of the polyhydric alcohol used in the synthesis of polyurethane resin (A2), are glycols, and trihydric or higher polyhydric alcohols. Examples of the glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propanediol, methylpropanediol, cyclohexanedimethanol, 3,3-diethyl-1,5-pentanediol, and the like. Examples of the trihydric or higher polyhydric alcohols include glycerol, trimethylolethane, trimethylolpropane, pentaerythritol, dipentaerythritol, and the like. These polyhydric alcohols can be used singly, or it is possible to employ combinations of two or more thereof.

Examples of the dimethylolalkanoic acid are dimethylolpropionic acid, dimethylolbutanoic acid, dimethylolpentanoic acid, dimethyloiheptanoic acid, dimethyloloctanoic acid, and dimethylolnonanoic acid. These dimethylolalkanoic acids can be used singly, or it is possible to employ combinations of two or more thereof.

Examples of the polyisocyanate compound include aromatic diisocyanates such as 4,4'-diphenylmethane diisocyanate, 2,4- or 2,6-tolylene diisocyanate, 1,5-naphthalene diisocyanate, p- or m-phenylene diisocyanate, xylylene diisocyanate, and m-tetramethylxylylene diisocyanate, alicyclic di-isocyanates such as isophorone diisocyanate, 4,4'- dicyclohexylmethane diisocyanate, 1,4-cyclohexylene diisocyanate, and hydrogenated tolylene diisocyanate, and aliphatic diisocyanates such as hexamethylene diisocyanate, etc. Of these, the alicyclic diisocyanates are preferred in terms of resistance to discoloration, etc. These diisocyanate compounds may be employed singly, or it is possible to use combinations of two or more thereof.

The hydroxyl value of polyurethane resin (A2) is from 20 to 80 mgKOH/g, and preferably from 40 to 60 mgKOH/g. If the hydroxyl value is less than 20 mgKOH/g, the chipping resistance of the coated film may be lowered, while if it exceeds 80 mgKOH/g the coated film external appearance may be impaired.

The acid value of polyurethane resin (A2) is from 10 to 60 mgKOH/g, and preferably from 20 to 40 mgKOH/g. If the acid value is less than 10 mgKOH/g, the coated film external appearance may be impaired, while if it exceeds 60 mgKOH/g then again the coated film external appearance may be impaired.

The number average molecular weight of polyurethane resin (A2) is from 2,000 to 10,000, and preferably from 3,000 to 6,000. If the number average molecular weight is less than 2,000, the coated film external appearance may be impaired, while if the number average molecular weight exceeds 10,000 the coated film external appearance may again be impaired.

Reference to the number average molecular weight in this specification is the value determined by means of gel permeation chromatography (GPC) using polystyrenes as standard materials.

The acrylic resin (A1) which forms the core portion in the core/shell type resin emulsion (A) can be obtained by known methods using a radical polymerization reaction wherein radically-polymerizable monomer which includes an acrylic monomer serves as the starting material component.

Examples of said radically-polymerizable monomer include (meth)acrylic acid, methyl (meth)acrylate, ethyl (meth)acrylate, n-propyl (meth)acrylate, isopropyl (meth) acrylate, n-butyl (meth)acrylate, isobutyl (meth)acrylate, sec-butyl (meth)acrylate, hexyl (meth)acrylate, 2-ethylhexyl (meth)acrylate, octyl (meth)acrylate, lauryl (meth)acrylate, stearyl (meth)acrylate, and other such (meth)acrylic acid aliphatic hydrocarbyl esters, allyl alcohol, 2-hydroxyethyl (meth)acrylate, 3-hydroxypropyl (meth)acrylate, 4-hydroxybutyl (meth)acrylate, and other such hydroxyl group-containing (meth)acrylate esters, styrene, □-methylstyrene, and other such alkyl-substituted styrenes, cyclohexyl (meth) acrylate, 4-tert-butylcyclohexyl (meth)acrylate, and other such alicyclic hydrocarbyl esters of (meth)acrylic acid, (meth)acrylonitrile, (meth)acrylamide, and the like. These radically-polymerizable monomers can be used on their own, or they can be used in combinations of two or more.

Radically-polymerizable monomers can be copolymerized in suitable combinations such that the number average molecular weight, hydroxyl value, and acid value of acrylic resin (A1) lie within the specified ranges discussed below.

Examples of the radical polymerization initiators employed include methyl ethyl ketone peroxide, cyclohexanone peroxide, 3,5,5-trimethylhexanone peroxide, 1,1-bis(tert-butylperoxy)-3,3,5-trimethylcyclohexane, 1,1-bis (tert-butylperoxy)cyclohexane, 2,2-bis(tert-butylperoxy) octane, tert-butyl hydroperoxide, diisopropylbenzene hydroperoxide, dicumyl peroxide, tert-butyl cumyl peroxide, isobutyl peroxide, lauroyl peroxide, benzoyl peroxide, diisopropyl peroxydicarbonate, tert-butyl peroxy-2-ethylhexanoate, tert-butyl peroxyneodecanoate, tert-butyl peroxylaurate, tert-butyl peroxybenzoate, tert-butylperoxy isopropyl carbonate, tert-butyl peroxyacetate, and other such organic peroxide compounds, etc. A single such radical polymerization initiator may be used, or combinations of two or more thereof may be employed.

There are no particular restrictions on the amount of radical polymerization initiator employed but it is preferably between 0.01 and 10 mass % in terms of the total amount of radically-polymerizable monomer. Furthermore, the temperature of the radical polymerization will differ according to the type of radical polymerization initiator used, but preferably polymerization is carried out under conditions of between 50 and 200° C., and more preferably between 80 and 160° C.

There are no particular restrictions in terms of the solvent, providing it can dissolve the radical polymerization initiator, and examples include glycol ether based solvents such as propylene glycol monomethyl ether, propylene glycol monoethyl ether, and the like. A single solvent may be used on its own, or there may also be employed a mixed solvent comprising two or more types thereof.

From the point of view of the coated film external appearance, the number average molecular weight of acrylic resin (A1) is preferably at least 20,000, and more preferably at least 100,000.

The hydroxyl value of acrylic resin (A1) is 10-30 mgKOH/g, and preferably 15-25 mgKOH/g. If the hydroxyl value is less than 10 mgKOH/g, there may be a lowering of the chipping resistance of the coated film, whereas if it exceeds 30 mgKOH/g the external appearance of the coated film may be impaired.

The acid value of acrylic resin (A1) is 0-10 mgKOH/g, and preferably 3-7 mgKOH/g. If the acid value exceeds 10 mgKOH/g, the external appearance of the coated film may be impaired.

The glass transition temperature of acrylic resin (A1) lies between 0 and 100° C., and preferably between 40 and 60° C. With a glass transition temperature of less than 0° C., there may be a lowering in the coated film hardness, whereas at more than 100° C. the chipping resistance may be lowered.

[Mass Ratio of the Core to Shell Portions]

In the core/shell type resin emulsion (A), the solids content mass ratio as denoted by {component (A1)/component (A2)} lies between 0.80 and 1.25, and preferably between 0.90 and 1.10. If the solids content mass ratio is less than 0.80, the external appearance of the coated film may be impaired, while if it is more than 1.25 the external appearance of the coated film may again be impaired.

The water-soluble or water-dispersible polyurethane resin (B) can be obtained by a known method, in the same way as the polyurethane resin which constitutes the shell portion of core/shell type resin emulsion (A).

From the point of view of the chipping resistance and the external appearance of the coated film, the number average molecular weight of water-soluble or water-dispersible polyurethane resin (B) is preferably between 1,000 and 10,000, and more preferably between 3,000 and 6,000.

From the point of view of the external appearance of the coated film and the water resistance, the hydroxyl value of the water-soluble or water-dispersible polyurethane resin (B) is preferably between 10 and 100 mgKOH/g, and more preferably between 20 and 80 mgKOH/g.

From the point of view of the emulsion stability of the resin in the waterborne coating material, and the water resistance, the acid value of the water-soluble or water-dispersible polyurethane resin (B) is preferably between 10 and 50 mgKOH/g, and more preferably between 20 and 50 mgKOH/g.

Water-soluble or water-dispersible polyester resin (C) can be obtained by a known method, using an esterification reaction in which polybasic acid and polyhydric alcohol are the starting material components, in the same way as in the case of the polyester polyol employed in the synthesis of the polyurethane resin which forms the shell portion of core/shell type resin emulsion (A).

From the point of view of chipping resistance and the external appearance of the coated film, the number average molecular weight of water-soluble or water-dispersible polyester resin (C) is preferably between 500 and 50,000, and more preferably between 1,000 and 30,000.

In terms of the external appearance of the coated film and the water resistance, the hydroxyl value of water-soluble or water-dispersible polyester resin (C) is preferably between 10 and 100 mgKOH/g, and more preferably between 20 and 80 mgKOH/g.

From the point of view of the emulsion stability of the resin in the waterborne coating material, and the water resistance, the acid value of water-soluble or water-dispersible polyester resin (C) preferably lies between 10 and 50 mgKOH/g, and more preferably between 20 and 50 mgKOH/g.

When aforesaid components (A) to (C) are used in the waterborne intermediate-coat coating material and in the waterborne basecoat coating material in the present invention, it is preferred that at least some of the acid groups in the respective components be neutralized using a base material. In this way, it is possible to maintain each of the components in a stable state in the waterborne coating materials.

Examples of the base material are ammonia, morpholine, N-alkylmorpholine, monoisopropanolamine, methylethanolamine, methylisopropanolamine, dimethylethanolamine, diisopropanolamine, diethanolamine, diethylethanolamine, triethanolamine, methylamine, ethylamine, propylamine, butylamine, 2-ethylhexylamine, dimethylamine, diethylamine, dipropylamine, dibutylamine, trimethylamine, triethylamine, triisopropylamine, tributylamine, and the like. These base materials can be employed on their own, or there may be used a combination of two or more thereof.

The amount, by solids content mass, of core/shell type resin emulsion (A) contained in the waterborne intermediate-coat coating material and in the waterborne basecoat coating material in the present invention lies between 5 and 25 mass %, and preferably between 10 and 20 mass %, in terms of the overall resin solids content, by mass, of components (A) to (C). Where the contained amount, by solids content mass, of core/shell type resin emulsion (A) is less than 5 mass %, the external appearance of the coated film may be impaired due to dulling, whereas if the contained amount, by solids content mass, of core/shell type resin emulsion (A) is more than 25 mass %, then the external appearance of the coated film may be impaired due to roughing.

The amount, by solids content mass, of water-soluble or water-dispersible polyurethane resin (B) contained in the waterborne intermediate-coat coating material and in the waterborne basecoat coating material in the present invention lies between 45 and 65 mass %, and preferably between 50 and 60 mass %, in terms of the overall resin solids content, by mass, of components (A) to (C). Where the contained amount, by solids content mass, of water-soluble or water-dispersible polyurethane resin (B) is less than 45 mass %, the chipping resistance may be lowered, whereas if the contained amount, by solids content mass, of water-soluble or water-dispersible polyurethane resin (B) is more than 65 mass %, then the coated film hardness may be reduced.

The amount, by solids content mass, of water-soluble or water-dispersible polyester resin (C) contained in the waterborne intermediate-coat coating material and in the waterborne basecoat coating material in the present invention lies between 20 and 40 mass %, and preferably between 25 and 35 mass %, in terms of the total overall resin solids content, by mass, of components (A) to (C). Where the contained amount, by solids content mass, of water-soluble or water-dispersible polyester resin (C) is less than 20 mass %, the coated film hardness may be lowered, whereas if the contained amount, by solids content mass, of water-soluble or water-dispersible polyester resin (C) is more than 40 mass %, then the chipping resistance may be lowered.

The waterborne intermediate-coat coating material and the waterborne basecoat coating material in the multilayer coated film forming method of the present invention also contain a melamine resin (D) as a crosslinking agent. Examples of said melamine resin (D) include the partially- or wholly-methylolated melamine resins obtained by the reaction between melamine and formaldehyde, partially- or wholly-alkyl ether type melamine resins obtained by the partial or total etherification of the methylol groups in methylolated melamine resins using an alcohol component, imino group-containing melamine resins, and melamine resins comprising mixtures of these. Examples of the alkyl ether type melamine resins here include methylated melamine resins, butylated melamine resins, and methyl/butyl mixed-alkyl type melamine resins, etc. These melamine resins can be used on their own, or they may be employed in combinations of two or more thereof.

The amount, by solids content mass, of the melamine resin (D) contained in the waterborne intermediate-coat coating material and also in the waterborne basecoat coating material in the present invention lies between 35 and 45 mass %, and preferably between 40 and 45 mass %, in terms of the overall resin solids content, by mass, of components (A) to (C). Where the contained amount, by solids content mass, of melamine resin (D) is less than 35 mass %, the coated film hardness may be lowered, whereas if the contained amount, by solids content mass, of melamine resin (D) is more than 45 mass %, then the chipping resistance may be reduced.

It is possible to include various types of pigments such as coloring pigments, luster/glitter pigments, extender pigments, and the like, in the waterborne intermediate-coat coating material and in the waterborne basecoat coating material in the multilayer coated film forming method of the present invention. Examples of the coloring pigments include yellow iron oxide, iron oxide, carbon black, titanium dioxide, and other inorganic pigments, azo chelate pigments, insoluble azo pigments, condensed azo pigments, phthalocyanine pigments, indigo pigments, perinone pigments, perylene pigments, dioxane pigments, quinacridone pigments, isoindolinone pigments, metal complex pigments, and other such organic pigments, etc. Examples of the luster/glitter pigments are aluminum flake pigments, alumina flake pigments, mica pigments, silica flake pigments, glass flake pigments, and the like. Furthermore, examples of the extender pigments include calcium carbonate, baryta, precipitated barium sulfate, clay, talc, and the like. These pigments may be used on their own, or they may also be used in combinations of two or more types thereof.

The amount, by mass ratio, of pigment contained in the waterborne intermediate-coat coating material and in the waterborne basecoat coating material employed in the multilayer coated film forming method of the present invention is, for example, from 3 to 200 mass % in terms of the coating material resin solids content.

It is also possible to include, in the waterborne intermediate-coat coating material and in the waterborne basecoat coating material used in the multilayer coated film forming method of the present invention, one or more additives such as surface conditioners, defoaming agents, surfactants, film-forming adjuvants, preservatives, UV absorbers, light stabilizers, and antioxidants, etc., as well as rheology controlling agents, and various organic solvents, etc.

Optionally, the waterborne intermediate-coat coating material and waterborne basecoat coating material used in the multilayer coated film forming method of the present invention can be supplied for coating after first diluting to a suitable viscosity using water or, sometimes, with a small amount of organic solvent or amine.

As the clearcoat coating material employed in the multilayer coated film forming method of the present invention, it is possible to use organic solventborne coating materials, waterborne coating materials, or powder coating materials. As examples of the substrate resin in the clearcoat coating material, there are acrylic resins, polyester resins, alkyd resins, and the like, and examples of the hardening system are melamine hardening, acid/epoxy hardening, isocyanate hardening, etc.

The acrylic resin for the clearcoat coating material can be obtained by a known method, utilizing a radical polymerization reaction with radically-polymerizable monomers as the starting material components, in the same way as the acrylic resin which forms the core portion of the core/shell type resin emulsion (A).

The acrylic resin of the clearcoat coating material is preferably an acrylic resin having, in the resin solids content, structural units (a) based on $\epsilon$-caprolactone, and structural units (b) based on radically-polymerizable monomer with a ring structure.

As examples of the method for obtaining an acrylic resin having structural units (a) based on $\epsilon$-caprolactone, and structural units (b) based on radically-polymerizable monomer with a ring structure, there are (1) the method in which caprolactone-modified radically-polymerizable monomer obtained by the ring-opening addition of $\epsilon$-caprolactone to a radically-polymerizable monomer which has a hydroxyl group, and radically-polymerizable monomer having a ring structure, plus other radically-polymerizable monomer, are subjected to copolymerization, and (2) the method in which the ring-opening addition of $\epsilon$-caprolactone is carried out either at the same time as, or subsequent to, the copolymerization of radically-polymerizable monomer which has a hydroxyl group, radically-polymerizable monomer having a ring structure, and other polymerizable monomer.

Examples of the radically-polymerizable monomer which has a hydroxyl group are allyl alcohol, 2-hydroxyethyl (meth)acrylate, 3-hydroxypropyl (meth)acrylate, and 4-hydroxybutyl (meth)acrylate. One of these radically-polymerizable monomers with a hydroxyl group may be employed on its own, or two or more may be employed in combination.

As examples of commercial-available caprolactone-modified radically-polymerizable monomers, there are those obtained by the addition of $\epsilon$-caprolactone to hydroxyl group-containing (meth)acrylate esters, such as Placcel FA-1, Placcel FM-1D, Placcel FM-2D, Placcel FM-3, and Placcel FM-4 (these are produced by the Daicel Corporation). One of these may be employed on its own, or a combination of two or more may be used.

In the case where the acrylic resin of the clearcoat coating material in the multilayer coated film forming method of the present invention is obtained by means of (2) above, the "contained proportion of the structural units (a) based on $\epsilon$-caprolactone" is the contained proportion of $\epsilon$-caprolactone which has undergone ring-opening addition.

The ring structure in the radically-polymerizable monomer with a ring structure may be an aromatic ring structure or it may be an alicyclic ring structure. Specific examples of radically-polymerizable monomers with a ring structure are styrene, cyclohexyl (meth)acrylate, and 4-tert-butylcyclohexyl (meth)acrylate. These radically-polymerizable monomers with a ring structure may be used on their own, or two or more may be employed in combination.

In the case where an acrylic resin is used in the clearcoat coating material of the multilayer coated film forming method of the present invention, from the point of view of scratch resistance the contained proportion of structural units (a) based on $\epsilon$-caprolactone is preferably at least 15 mass %, and more preferably 18-27 mass %, of the aforesaid acrylic resin solids content.

Moreover, in terms of scratch resistance, the contained proportion, by mass, of structural units based on radically-polymerizable monomer with a ring structure in terms of the structural units (a) based on $\epsilon$-caprolactone is preferably 50-100 mass %, and more preferably 50-60 mass %.

In the case where the acrylic resin of the clearcoat coating material in the multilayer coated film forming method of the present invention is obtained by means of (1) above, the "contained proportion of structural units (a) based on $\epsilon$-caprolactone" is not the contained proportion of caprolactone-modified radical monomer obtained by the ring-opening addition of $\epsilon$-caprolactone to the radically-polymerizable monomer with a hydroxyl group, but is the proportion only of the $\epsilon$-caprolactone which has undergone ring-opening addition.

In the case where a polyisocyanate compound is used in the clearcoat coating material of the multilayer coated film forming method of the present invention, examples of said polyisocyanate compound include hexamethylene diisocyanate, trimethyihexamethylene diisocyanate, dimer acid diisocyanate, and other such aliphatic diisocyanates, isophorone diisocyanate, hydrogenated XDI, hydrogenated TDI, hydrogenated MDI, and other alicyclic diisocyanates, and tolylene diisocyanate (TDI), xylylene diisocyanate (XDI), meta-xylylene diisocyanate, 4,4-diphenylmethane diisocyanate (MDI), and other such aromatic diisocyanates, together with the adducts, biurets, isocyanurates, etc., thereof.

In the case where a polyisocyanate compound is employed in the clearcoat coating material in the multilayer coated film forming method of the present invention, from the point of view of hardenability and coated film hardness the amount of polyisocyanate compound incorporated lies in the range from 0.2 to 2.0, and more preferably from 0.5 to 1.5, based on the mole ratio (NCO/OH) of isocyanate groups from the polyisocyanate compound and hydroxyl groups from the acrylic resin in clearcoat coating material (C).

The clearcoat coating material composition in the present invention may contain the above components, or, optionally, it may also be employed along with the addition of an organic solvent, or various types of additives, such as UV absorbers, light stabilizers, antioxidants, surfactants, surface conditioners, hardening catalysts, antistatic agents, fragrances, desiccants, or rheology modifiers such as polyethylene wax, polyamide wax, internally-crosslinked fine resin particles, etc.

Methods normally used in the automobile industry can be employed as the method of application of each of the coating materials in the multilayer coated film forming method of the present invention, examples of which are air spray coating, electrostatic air atomizer coating, rotary bell spray coating, and the like.

In the multilayer coated film forming method of the present invention, first of all the waterborne intermediate-coat coating material is coated onto the hardened electrocoat.

The temperature and humidity conditions at the time of the coating of the waterborne intermediate-coat coating material are not particularly restricted and are, for example, 10-40° C. and 65-85% (relative humidity). Furthermore, the dry film thickness of the intermediate coat obtained by the coating of waterborne intermediate-coat coating material (A) is, for example, 10-30 µm.

In the multilayer coated film forming method of the present invention, following the coating of the waterborne intermediate-coat coating material, the waterborne basecoat coating material is coated onto the intermediate coat without performing flash-off.

The temperature and humidity conditions at the time of the coating of the waterborne basecoat coating material are not particularly restricted and, for example, are 10-40° C. and 65-85% (relative humidity). Furthermore, the dry film thickness of the basecoat obtained by the coating of waterborne basecoat coating material is, for example, 5-15 µm.

In the multilayer coated film forming method of the present invention, flash-off may be carried out following the coating of the waterborne basecoat coating material. The preferred conditions in the case where flash-off is carried out are 30-100° C. and 3-10 minutes.

In the multilayer coated film forming method of the present invention, a clearcoat coating material is coated onto the basecoat.

The dry film thickness of the clearcoat obtained by the coating of the clearcoat coating material is not particularly restricted and, for example, lies in the range 10 to 100 µm.

In the multilayer coated film forming method of the present invention, the intermediate coat, the basecoat, and the clearcoat, formed by the methods described above, are then subjected to heating and hardening to bring about simultaneous heated-hardening (hot curing) thereof and, in this way, it is possible to obtain a multilayer coated film which is outstanding in terms of the coated film external appearance.

In the heating and hardening step of the multilayer coated film forming method of the present invention, the hardening temperature and the time are, for example, 120-170° C. for 10-60 minutes.

WORKING EXAMPLES

Below, the present invention is explained in further detail by providing working examples, but the present invention is not to be restricted thereto. Unless otherwise stated, references to parts, percentage (%), and ratio in the examples respectively denote parts by mass, mass %, and mass ratio. Furthermore, the units for the blended amounts of each of the components described in the tables are parts by mass.

Moreover, the hydroxyl value was measured in accordance with JIS K-0070 (1992), and the acid value was measured in accordance with JIS K-5601-2-(1999).

Production Example 1: Production of the Polyester Polyol 54.0 parts of dimer acid (commercial name "Empol 1008", produced by BASF; number of carbons 36), 8.0 parts of neopentyl glycol, 17.8 parts of isophthalic acid, 19.4 parts of 1,6-hexanediol, and 0.8 parts of trimethylolpropane were introduced into a reaction vessel equipped with a reflux condenser having an attached tube for separating-off the water of reaction, a nitrogen gas introduction means, a thermometer, and a stirring means, and then the temperature was raised to 120° C. to dissolve the starting materials, after which the temperature was further raised to 160° C. while stirring. After maintaining for 1 hour at 160° C., the temperature was slowly increased to 230° C. over five hours. The reaction was then continued with the temperature maintained at 230° C. and, when the resin acid value reached 4 mgKOH/g, cooling was performed to below 80° C., following which 31.6 parts of methyl ethyl ketone were added and the polyester polyol obtained. The property values of this polyester polyol were a resin solids content of 74.6%, a number average molecular weight of 1,800, a hydroxyl value of 62 mgKOH/g, and an acid value of 4 mgKOH/g.

Production Example 2-1: Production of Polyurethane Resin PU-1

81.4 parts of the polyester polyol obtained in Production Example 1, 6.1 parts of dimethylolpropionic acid, 1.4 parts of neopentyl glycol, and 40.0 parts of methyl ethyl ketone were introduced into a reaction vessel equipped with a nitrogen inlet means, a thermometer, and a stirring means, and the temperature raised to 80° C. while stirring, after which 25.9 parts of isophorone diisocyanate were added and the components reacted together while maintaining at 80° C. When the isocyanate value reached 0.43 meq/g, 5.9 parts of trimethylolpropane were added, and reaction continued at 80° C. When the isocyanate value reached 0.01 meq/g, 33.3 parts of Butyl Cellosolve were added and the reaction halted. Subsequently, the temperature was raised to 100° C. and the methyl ethyl ketone removed under reduced pressure. The temperature was then lowered to 50° C., and 3.6 parts of dimethylethanolamine added, after which 148.9 parts of deionized water were added, and polyurethane resin PU-1 having the property values shown in Table 1 was thus obtained.

Production Examples 2-2 to 2-9: Production of Polyurethane Resins PU-2 to PU-9

Polyurethane resins PU-2 to PU-9 having the property values shown in Table 1 (resin solids content, hydroxyl value, acid value, and number average molecular weight) were obtained by the same method as in Production Example 2-1, based on the formulations given in Table 1. In regard to PU-3, PU-4 and PU-8, these were produced using neopentyl glycol instead of the trimethylolpropane employed at the time of the production of PU-1.

TABLE 1

| Waterborne Polyurethane Resin | PU-1 | PU-2 | PU-3 | PU-4 | PU-5 | PU-6 | PU-7 | PU-8 | PU-9 |
|---|---|---|---|---|---|---|---|---|---|
| polyester polyol | 81.4 | 57.6 | 76.1 | 83.1 | 80.0 | 79.0 | 58.0 | 62.9 | 83.2 |
| dimethylol-propionic acid | 6.1 | 13.4 | 2.5 | 6.2 | 5.9 | 0.9 | 15.0 | 6.4 | 6.3 |
| neopentyl glycol | 1.4 | | | 1.4 | | 5.4 | | 1.3 | 1.4 |
| methyl ethyl ketone | 40.0 | 80.0 | 40.0 | 40.0 | 40.0 | 40.0 | 40.0 | 40.0 | 80.0 |
| isophorone diisocyanate | 25.9 | 37.1 | 28.8 | 26.4 | 25.0 | 27.9 | 35.7 | 33.5 | 26.5 |
| trimethylol-propane | 5.9 | 6.6 | | | 9.4 | 6.8 | 6.0 | | 3.8 |
| neopentyl glycol | | | 12.0 | 3.9 | | | | 11.7 | |
| Butyl Cellosolve | 33.3 | 70.0 | 33.3 | 33.3 | 33.3 | 33.3 | 33.3 | 33.3 | 70.0 |
| dimethyl-ethanolamine | 3.6 | 7.4 | 1.6 | 3.7 | 3.4 | 0.8 | 8.2 | 3.6 | 3.6 |
| deionized water | 148.9 | 222.6 | 151.0 | 148.9 | 148.9 | 152.0 | 144.0 | 148.9 | 226.0 |
| Total | 285.8 | 400.1 | 286.0 | 285.8 | 285.6 | 286.0 | 285.5 | 285.6 | 399.7 |
| resin solids content (mass %) | 35.0% | 25.0% | 35.0% | 35.0% | 35.0% | 34.9% | 35.0% | 34.9% | 25.0% |
| hydroxyl value (mgKOH/g) | 50 | 37 | 42 | 18 | 81 | 50 | 50 | 57 | 23 |
| acid value (mgKOH/g) | 28 | 58 | 13 | 29 | 27 | 6 | 65 | 28 | 28 |
| number average molecular weight | 4000 | 9000 | 2500 | 5300 | 2500 | 4700 | 4000 | 1900 | 11000 |

Production Example 3-1: Production of Core/Shell Type Resin Emulsion AU-1

46.4 parts of polyurethane resin PU-1, and 33.1 parts of deionized water were introduced into a flask equipped with a thermometer, a stirring means and a nitrogen gas inlet tube, and the temperature raised to 85° C. while stirring, after which, as dropwise-added components, a uniform liquid mixture of 4.9 parts of styrene, 7.0 parts of methyl methacrylate, 3.5 parts of n-butyl acrylate, 0.8 parts of 2-hydroxyethyl methacrylate, and 0.1 part of acrylic acid, and a uniform liquid mixture of 0.24 parts of tert-butyl peroxy-2-ethylhexanoate and 3.8 parts of propylene glycol monomethyl ether as solvent, were respectively simultaneously added by dropwise addition with a dropping funnel at a uniform rate over 3.5 hours. Following the end of the dropwise addition, after maintaining for 1 hour at 85° C. there was added, as supplementary catalyst, a polymer initiator solution formed by dissolving 0.03 parts of tert-butyl peroxy-2-ethylhexanoate in 0.14 parts of propylene glycol monomethyl ether as solvent and, after holding for a further 1 hour at 85° C., the reaction was halted. Core/shell type resin emulsion AU-1 was obtained having the property values shown in Table 2 (acrylic resin hydroxyl value, acid value, and glass transition temperature, plus the resin solids content (mass %) of the core/shell type resin emulsion, and the core portion/shell portion mass ratio).

Production Examples 3-2 to 3-18: Production of Core/Shell Type Resin Emulsions AU-2 to AU-18

Core/shell type resin emulsions AU-2 to AU-18 were obtained by an identical method to Production Example 3-1, based on the formulations shown in Table 2 and Table 3.

TABLE 2

| | Core/Shell type Resin Emulsion | AU-1 | AU-2 | AU-3 | AU-4 | AU-5 | AU-6 | AU-7 | AU-8 | AU-9 |
|---|---|---|---|---|---|---|---|---|---|---|
| initial charge | PU-1 | 46.4 | | 46.4 | 46.4 | | 46.4 | 46.4 | 46.4 | 46.4 |
| | PU-2 | | 70.0 | | | | | | | |
| | PU-3 | | | | | 43.6 | | | | |
| | PU-4 | | | | | | | | | |
| | PU-5 | | | | | | | | | |
| | PU-6 | | | | | | | | | |
| | PU-7 | | | | | | | | | |
| | PU-8 | | | | | | | | | |
| | PU-9 | | | | | | | | | |
| | deionized water | 33.1 | 11.1 | 33.1 | 33.1 | 34.7 | 33.1 | 33.1 | 33.1 | 33.1 |
| components added dropwise | styrene | 4.9 | 4.5 | 4.9 | 4.9 | 5.2 | 4.9 | 4.9 | 4.9 | 4.9 |
| | methyl methacrylate | 7.0 | 6.2 | 10.1 | 3.3 | 7.3 | 7.3 | 6.5 | 6.9 | 1.6 |
| | n-butyl acrylate | 3.5 | 3.2 | 0.7 | 7.2 | 3.7 | 3.6 | 3.4 | 3.5 | 8.9 |
| | 2-hydroxyethyl methacrylate | 0.8 | 1.0 | 0.4 | 0.8 | 0.8 | 0.3 | 1.3 | 0.8 | 0.8 |
| | acrylic acid | 0.1 | 0.1 | 0.1 | 0.1 | 0.1 | 0.1 | 0.1 | 0.3 | 0.1 |
| | tert-butyl peroxy-2-ethylhexanoate | 0.24 | 0.22 | 0.24 | 0.24 | 0.26 | 0.24 | 0.24 | 0.24 | 0.24 |
| | propylene glycol monomethyl ether | 3.8 | 3.5 | 3.8 | 3.8 | 4.0 | 3.8 | 3.8 | 3.8 | 3.8 |
| supplementary catalyst | tert-butyl peroxy-2-ethylhexanoate | 0.03 | 0.03 | 0.03 | 0.03 | 0.03 | 0.03 | 0.03 | 0.03 | 0.03 |
| | propylene glycol monomethyl ether | 0.14 | 0.14 | 0.14 | 0.14 | 0.14 | 0.14 | 0.14 | 0.14 | 0.14 |
| | Total | 100.01 | 99.99 | 99.91 | 100.01 | 99.83 | 99.91 | 99.91 | 100.11 | 100.01 |
| acrylic resin | hydroxyl value (mgKOH/g) | 20 | 28 | 11 | 20 | 20 | 9 | 35 | 20 | 20 |
| | acid value (mgKOH/g) | 5 | 5 | 5 | 5 | 9 | 5 | 5 | 12 | 5 |
| | glass transition temp (° C.) | 50 | 50 | 90 | 10 | 50 | 50 | 50 | 50 | −5 |
| core/shell type resin emulsion | resin solids content (mass %) | 32.5 | 32.5 | 32.5 | 32.5 | 32.4 | 32.5 | 32.5 | 32.6 | 32.5 |
| | core/shell mass ratio | 1.00 | 1.17 | 1.00 | 1.00 | 0.89 | 1.00 | 1.00 | 0.99 | 1.00 |

TABLE 3

| Core/Shell type Resin Emulsion | | AU-10 | AU-11 | AU-12 | AU-13 | AU-14 | AU-15 | AU-16 | AU-17 | AU-18 |
|---|---|---|---|---|---|---|---|---|---|---|
| initial charge | PU-1 | 46.4 | | | | | | | 52.8 | 39.8 |
| | PU-2 | | | | | | | | | |
| | PU-3 | | | | | | | | | |
| | PU-4 | | 46.4 | | | | | | | |
| | PU-5 | | | 46.4 | | | | | | |
| | PU-6 | | | | 46.4 | | | | | |
| | PU-7 | | | | | 46.4 | | | | |
| | PU-8 | | | | | | 46.4 | | | |
| | PU-9 | | | | | | | 65.0 | | |
| | deionized water | 33.1 | 33.1 | 33.1 | 33.1 | 33.1 | 33.1 | 14.5 | 29.5 | 36.8 |
| components added dropwise | styrene | 4.3 | 4.9 | 4.9 | 4.9 | 4.9 | 4.9 | 4.9 | 4.2 | 5.6 |
| | methyl methacrylate | 11.1 | 7.0 | 7.0 | 7.0 | 7.0 | 7.0 | 7.0 | 6.0 | 8.0 |
| | n-butyl acrylate | 0.0 | 3.5 | 3.5 | 3.5 | 3.5 | 3.5 | 3.5 | 3.0 | 4.0 |
| | 2-hydroxyethyl methacrylate | 0.8 | 0.8 | 0.8 | 0.8 | 0.8 | 0.8 | 0.8 | 0.6 | 0.9 |
| | acrylic acid | 0.1 | 0.1 | 0.1 | 0.1 | 0.1 | 0.1 | 0.1 | 0.1 | 0.1 |
| | tert-butyl peroxy-2-ethylhexanoate | 0.24 | 0.24 | 0.24 | 0.24 | 0.24 | 0.24 | 0.24 | 0.21 | 0.28 |
| | propylene glycol monomethyl ether | 3.8 | 3.8 | 3.8 | 3.8 | 3.8 | 3.8 | 3.8 | 3.3 | 4.3 |
| supplementary catalyst | tert-butyl peroxy-2-ethylhexanoate | 0.03 | 0.03 | 0.03 | 0.03 | 0.03 | 0.03 | 0.03 | 0.03 | 0.03 |
| | propylene glycol monomethyl ether | 0.14 | 0.14 | 0.14 | 0.14 | 0.14 | 0.14 | 0.14 | 0.14 | 0.14 |
| | Total | 100.01 | 100.01 | 100.01 | 100.01 | 100.01 | 100.01 | 100.01 | 100.11 | 100.01 |
| acrylic resin | hydroxyl value (mgKOH/g) | 20 | 20 | 20 | 20 | 20 | 20 | 20 | 20 | 20 |
| | acid value (mgKOH/g) | 5 | 5 | 5 | 5 | 5 | 5 | 5 | 5 | 5 |
| | glass transition temp (° C.) | 101 | 50 | 50 | 50 | 50 | 50 | 50 | 50 | 50 |
| core/shell type resin emulsion | resin solids content (mass %) | 32.5 | 32.5 | 32.5 | 32.5 | 32.5 | 32.5 | 32.5 | 32.4 | 32.5 |
| | core/shell mass ratio | 1.00 | 1.00 | 1.00 | 1.00 | 1.00 | 1.00 | 1.00 | 1.33 | 0.75 |

Production Example 4-1: Production of Acrylic Copolymer Resin A-1 for the Clearcoat Coating Material 18 parts of xylene, and 7 parts of methyl amyl ketone were introduced into a four-necked flask equipped with a thermometer, stirrer, reflux condenser, and dropping funnel, and the temperature raised to 140° C. Next, as dropwise-added components, a mixture of 24 parts of Placcel FM-1 (produced by the Daicel Corporation; monomer formed by the addition of 1 mol of ε-caprolactone to the hydroxyl group of hydroxyethyl methacrylate), 9 parts of styrene, 5 parts of 2-hydroxyethyl methacrylate, 21.4 parts of n-butyl acrylate, 0.6 parts of acrylic acid, and 2 parts of tert-butyl peroxy-2-ethylhexanoate, was added dropwise from a dropping funnel over 2 hours. Following the end of the dropwise addition, the reflux temperature was maintained for 1 hour, and then the contents cooled to 100° C. Having cooled to 100° C., a mixture of 0.2 parts of tert-butyl peroxybenzoate and 3 parts of xylene was added dropwise, as supplementary catalyst. Subsequently, by maintaining for 3 hours at a temperature of 100° C., the polymerization reaction was taken to completion, 9.8 parts of xylene added and a solution of resin A-1 was obtained.

Working Example 1

A waterborne intermediate-coat coating material and a waterborne basecoat coating material were produced by the method described below, then these coating materials used to form a multilayer coated film and the properties evaluated.

<Production of the Waterborne Intermediate-Coat Coating Material>

Using a waterborne polyester resin (commercial name "Setaqua 6407", produced by Nuplex Resins Ltd; acid value 11 mgKOH/g, hydroxyl value 89 mgKOH/g, resin solids content 26%) as the dispersion resin, 30.7 parts of titanium dioxide (commercial name "Ti-Pure R706", produced by DuPont), and 0.4 parts of carbon black (commercial name "MA-100", produced by the Mitsubishi Chemical Corp.) were dispersed using a mortar mill, and a pigment paste produced.

Next, a resin paste was produced by mixing 10.2 parts of core/shell type resin emulsion AU-1, and 29.7 parts of a waterborne polyurethane resin (commercial name "Bayhydrol PT241", produced by the Sumitomo Bayer Urethane Co.; hydroxyl value 82 mgKOH/g, resin solids content 41%) using a dissolver, after which the pigment paste produced above was added, and mixing performed. Finally, 9.8 parts of melamine resin (commercial name "Cymel 327", produced by Cytec Industries; resin solids content 90%) was added and mixing performed, and waterborne intermediate-coat coating material PR-1 obtained. The waterborne polyester resin content in waterborne intermediate-coat coating material PR-1 was 25.6 parts.

<Production of Waterborne Basecoat Coating Material>

Using a waterborne polyester resin (commercial name "Setaqua 6407", produced by Nuplex Resins Ltd; acid value 11 mgKOH/g, hydroxyl value 89 mgKOH/g, resin solids content 26%) as the dispersion resin, 2.3 parts of carbon black (commercial name "MA-100", produced by the Mitsubishi Chemical Corp.) was dispersed using a mortar mill, and a pigment paste produced.

Next, a resin paste was produced by mixing 10.2 parts of core/shell type resin emulsion AU-1, and 29.7 parts of a waterborne polyurethane resin (commercial name "Bayhydrol PT241", produced by the Sumitomo Bayer Urethane Co.; hydroxyl value 82 mgKOH/g, resin solids content 41%) using a dissolver, after which the pigment paste produced above was added and mixing performed. Finally, 9.8 parts of melamine resin (commercial name "Cymel 327", produced by Cytec Industries; resin solids content 90%) were added and mixing performed, and waterborne basecoat coating material BC-1 obtained. The waterborne polyester resin content in waterborne basecoat coating material BC-1 was 25.6 parts.

<Production of the Clearcoat Coating Material>

60 parts of acrylic copolymer resin A-1, 15.8 parts of Desmodur N3300 (produced by the Sumitomo Bayer Urethane Co.; liquid hexamethylene diisocyanate based isocyanurate type resin, resin solids content 100%), 1.0 part of a 20 mass % xylene solution of Tinuvin 900 (a UV absorber, produced by BASF), 0.5 parts of a 20 mass % xylene solution of Tinuvin 292 (a light stabilizer, produced by BASF), 0.1 part of a 10 mass % xylene solution of BYK-300 (a surface conditioner, produced by BYK Chemie), 11.3 parts of Solvesso 100 (produced by Esso), and 11.3 parts of isobutyl acetate were mixed together in turn, and stirred until uniform, to produce clearcoat coating material CC-1.

<Coated Film Properties Evaluation>

A cathodic electrodeposition coating material (commercial name "CathoGuard No 500", produced by BASF Japan Ltd) was applied by electrodeposition onto a zinc phosphate-treated mild steel plate to give a dry film thickness of 20 μm, and then baking carried out for 25 minutes at 175° C., to produce the electrodeposition-coated plate (hereinafter just referred to as the 'electrocoated plate') used in the evaluations.

The prepared waterborne intermediate-coat coating material PR-1 and the waterborne basecoat coating material BC-1 were diluted with deionized water to a viscosity of 40 seconds (Ford Cup #4, 20° C.). Furthermore, a rotary bell spray coater (commercial name "Metallic Bell G1-Copes Bell", produced by the ABB Co.) was prepared, the coating conditions set to 25° C. and 75% (relative humidity), and multilayer coated film formation carried out by the following method.

The waterborne intermediate-coat coating material PR-1 was coated onto the electrocoated plate to give a dry film thickness of 20 μm. Subsequently, this was left to stand in a room for 5 minutes, after which coating of the waterborne basecoat coating material BC-1 was carried out to a dry film thickness of 12 μm. Following the coating, and after leaving to stand for 5 minutes at room temperature, preliminary heating was carried out for 3 minutes at 80° C. After allowing to cool to room temperature, application of the clearcoat coating material CC-1 was carried out to a dry film thickness of 30 μm Following the coating, and after leaving to stand for 10 minutes at room temperature, baking was performed for 30 minutes at 140° C., and a test-piece obtained.

(1) Coated Film External Appearance

The smoothness of the coated film surface was measured by means of a "Wavescan DOI" (commercial name, produced by the BYK Gardner Co.) and, from the Sw value obtained, the coated film appearance of the test-piece was evaluated based on the following criteria.
⊚: Sw value at least 10 and less than 15
○: Sw value at least 15 and less than 20
x: Sw value 20 or more (2) Chipping Resistance The test coated plate was set in a flying stones tester (commercial name, "JA-400LA model"; produced by the Suga Test Instruments Co.), at an angle of 45° and under a −20° C. environment, then 250 g of M2 nuts discharged at 5 Kg/cm² so as to impact the coated film surface and, after performing peeling using cellophane tape, the extent of the peeling loss was evaluated based on the following criteria. The evaluation of the peeling loss was carried out within a frame of 70 mm length×70 mm width in the region subject to impact.
⊚: peeled area, in terms of evaluated area, 0.0 or more but less than 1.0%
○: peeled area, in terms of evaluated area, at least 1.0 but less than 3.0%
x: peeled area, in terms of evaluated area, at least 3.0%

(3) Coated Film Hardness

The coated film hardness was measured by the pencil scratch test method (JIS-K5600), and evaluation carried out as follows.
○: HB or better
x: less than HB (B or worse)

The results of these evaluations are shown in Table 8.

Working Examples 2 to 9, Comparative Examples 1 to 21

Using the waterborne intermediate-coat coating materials shown in Tables 4 to 6, and the waterborne basecoat coating materials shown in Table 7, test-pieces were prepared by the same method as in Working Example 1 and evaluations of the coated film properties carried out. The evaluation results are shown in Tables 8 to 11. In the tables, the solids content refers to the resin solids content.

TABLE 4

| Waterborne Intermediate-coat Coating Material | | PR-1 | PR-2 | PR-3 | PR-4 | PR-5 | PR-6 | PR-7 | PR-8 | PR-9 | PR-10 |
|---|---|---|---|---|---|---|---|---|---|---|---|
| core/shell type resin emulsion | AU-1 (solids content 32.5%) | 10.2 | | | | | 3.4 | 17.1 | 3.4 | 17.1 | |
| | AU-2 (solids content 32.5%) | | 10.2 | | | | | | | | |
| | AU-3 (solids content 32.5%) | | | 10.2 | | | | | | | |
| | AU-4 (solids content 32.5%) | | | | 10.2 | | | | | | |
| | AU-5 (solids content 32.4%) | | | | | 10.2 | | | | | |
| | AU-6 (solids content 32.5%) | | | | | | | | | | 10.2 |
| waterborne polyurethane resin (solids content 41%) | | 29.7 | 29.7 | 29.7 | 29.7 | 29.7 | 35.1 | 24.3 | 29.7 | 29.7 | 29.7 |
| waterborne polyester resin (solids content 26%) | | 25.6 | 25.6 | 25.6 | 25.6 | 25.6 | 25.6 | 25.6 | 34.1 | 17.1 | 25.6 |
| melamine resin (solids content 90%) | | 9.8 | 9.8 | 9.8 | 9.8 | 9.8 | 9.8 | 9.8 | 9.8 | 9.8 | 9.8 |
| titanium dioxide | | 30.7 | 30.7 | 30.7 | 30.7 | 30.7 | 30.7 | 30.7 | 30.7 | 30.7 | 30.7 |
| carbon black | | 0.4 | 0.4 | 0.4 | 0.4 | 0.4 | 0.4 | 0.4 | 0.4 | 0.4 | 0.4 |
| | Total | 106.4 | 106.4 | 106.4 | 106.4 | 106.4 | 105.0 | 107.9 | 108.1 | 104.8 | 106.4 |
| substrate resin content ratio | core/shell type resin emulsion | 15% | 15% | 15% | 15% | 15% | 5% | 25% | 5% | 25% | 15% |
| | waterborne polyurethane resin | 55% | 55% | 55% | 55% | 55% | 65% | 45% | 55% | 55% | 55% |
| | waterborne polyester resin | 30% | 30% | 30% | 30% | 30% | 30% | 30% | 40% | 20% | 30% |
| {(melamine resin)/substrate resin} | | 40% | 40% | 40% | 40% | 40% | 40% | 40% | 40% | 40% | 40% |
| (pigment)/(resin) | | 1.0 | 1.0 | 1.0 | 1.0 | 1.0 | 1.0 | 1.0 | 1.0 | 1.0 | 1.0 |

TABLE 5

| Waterborne Intermediate-coat Coating Material | | PR-11 | PR-12 | PR-13 | PR-14 | PR-15 | PR-16 | PR-17 | PR-18 | PR-19 | PR-20 |
|---|---|---|---|---|---|---|---|---|---|---|---|
| core/shell type resin emulsion | AU-7 (solids content 32.5%) | 10.2 | | | | | | | | | |
| | AU-8 (solids content 32.6%) | | 10.2 | | | | | | | | |
| | AU-9 (solids content 32.5%) | | | 10.2 | | | | | | | |
| | AU-10 (solids content 32.5%) | | | | 10.2 | | | | | | |
| | AU-11 (solids content 32.5%) | | | | | 10.2 | | | | | |
| | AU-12 (solids content 32.5%) | | | | | | 10.2 | | | | |
| | AU-13 (solids content 32.5%) | | | | | | | 10.2 | | | |
| | AU-14 (solids content 32.5%) | | | | | | | | 10.2 | | |
| | AU-15 (solids content 32.5%) | | | | | | | | | 10.2 | |
| | AU-16 (solids content 32.5%) | | | | | | | | | | 10.2 |
| waterborne polyurethane resin (solids content 41%) | | 29.7 | 29.7 | 29.7 | 29.7 | 29.7 | 29.7 | 29.7 | 29.7 | 29.7 | 29.7 |
| waterborne polyester resin (solids content 26%) | | 25.6 | 25.6 | 25.6 | 25.6 | 25.6 | 25.6 | 25.6 | 25.6 | 25.6 | 25.6 |
| melamine resin (solids content 90%) | | 9.8 | 9.8 | 9.8 | 9.8 | 9.8 | 9.8 | 9.8 | 9.8 | 9.8 | 9.8 |
| titanium dioxide | | 30.7 | 30.7 | 30.7 | 30.7 | 30.7 | 30.7 | 30.7 | 30.7 | 30.7 | 30.7 |
| carbon black | | 0.4 | 0.4 | 0.4 | 0.4 | 0.4 | 0.4 | 0.4 | 0.4 | 0.4 | 0.4 |
| | Total | 106.4 | 106.4 | 106.4 | 106.4 | 106.4 | 106.4 | 106.4 | 106.4 | 106.4 | 106.4 |
| substrate resin content ratio | core/shell type resin emulsion | 15% | 15% | 15% | 15% | 15% | 15% | 15% | 15% | 15% | 15% |
| | waterborne polyurethane resin | 55% | 55% | 55% | 55% | 55% | 55% | 55% | 55% | 55% | 55% |
| | waterborne polyester resin | 30% | 30% | 30% | 30% | 30% | 30% | 30% | 30% | 30% | 30% |
| {(melamine resin)/substrate resin} | | 40% | 40% | 40% | 40% | 40% | 40% | 40% | 40% | 40% | 40% |
| (pigment)/(resin) | | 1.0 | 1.0 | 1.0 | 1.0 | 1.0 | 1.0 | 1.0 | 1.0 | 1.0 | 1.0 |

TABLE 6

| Waterborne Intermediate-coat Coating Material | | PR-21 | PR-22 | PR-23 | PR-24 | PR-25 | PR-26 | PR-27 | PR-28 | PR-29 | PR-30 |
|---|---|---|---|---|---|---|---|---|---|---|---|
| core/shell type resin emulsion | AU-1 (solids content 32.5%) | | | | 20.4 | 13.6 | 6.8 | 13.6 | 6.8 | 10.2 | 10.2 |
| | AU-17 (solids content 32.4%) | 10.2 | | | | | | | | | |
| | AU-18 (solids content 32.5%) | | | 10.2 | | | | | | | |
| waterborne polyurethane resin (solids content 41%) | | 29.7 | 29.7 | 35.1 | 27.0 | 21.6 | 37.8 | 35.1 | 24.3 | 29.7 | 29.7 |
| waterborne polyester resin (solids content 26%) | | 25.6 | 25.6 | 29.9 | 17.1 | 34.1 | 17.1 | 12.8 | 38.3 | 25.6 | 25.6 |
| melamine resin (solids content 90%) | | 9.8 | 9.8 | 9.8 | 9.8 | 9.8 | 9.8 | 9.8 | 9.8 | 7.4 | 12.3 |
| titanium dioxide | | 30.7 | 30.7 | 30.7 | 30.7 | 30.7 | 30.7 | 30.7 | 30.7 | 28.4 | 32.9 |
| carbon black | | 0.4 | 0.4 | 0.4 | 0.4 | 0.4 | 0.4 | 0.4 | 0.4 | 0.4 | 0.4 |
| | Total | 106.4 | 106.4 | 105.9 | 105.4 | 110.2 | 102.6 | 102.4 | 110.3 | 101.7 | 111.1 |
| substrate resin content ratio | core/shell type resin emulsion | 15% | 15% | 0% | 30% | 20% | 10% | 20% | 10% | 15% | 15% |
| | waterborne polyurethane resin | 55% | 55% | 65% | 50% | 40% | 70% | 65% | 45% | 55% | 55% |
| | waterborne polyester resin | 30% | 30% | 35% | 20% | 40% | 20% | 15% | 45% | 30% | 30% |
| {(melamine resin)/substrate resin} | | 40% | 40% | 40% | 40% | 40% | 40% | 40% | 40% | 30% | 50% |
| (pigment)/(resin) | | 1.0 | 1.0 | 1.0 | 1.0 | 1.0 | 1.0 | 1.0 | 1.0 | 1.0 | 1.0 |

TABLE 7

| Waterborne Basecoat Coating Material | | BC-1 | BC-2 | BC-3 | BC-4 | BC-5 | BC-6 | BC-7 | BC-8 | BC-9 |
|---|---|---|---|---|---|---|---|---|---|---|
| core/shell type resin emulsion | AU-1 (solids content 32.5%) | 10.2 | | | | | 3.4 | 17.1 | 3.4 | 17.1 |
| | AU-2 (solids content 32.5%) | | 10.2 | | | | | | | |
| | AU-3 (solids content 32.5%) | | | 10.2 | | | | | | |
| | AU-4 (solids content 32.5%) | | | | 10.2 | | | | | |
| | AU-5 (solids content 32.4%) | | | | | 10.2 | | | | |
| waterborne polyurethane resin (solids content 41%) | | 29.7 | 29.7 | 29.7 | 29.7 | 29.7 | 35.1 | 24.3 | 29.7 | 29.7 |
| waterborne polyester resin (solids content 26%) | | 25.6 | 25.6 | 25.6 | 25.6 | 25.6 | 25.6 | 25.6 | 34.1 | 17.1 |
| melamine resin (solids content 90%) | | 9.8 | 9.8 | 9.8 | 9.8 | 9.8 | 9.8 | 9.8 | 9.8 | 9.8 |
| carbon black | | 2.3 | 2.3 | 2.3 | 2.3 | 2.3 | 2.3 | 2.3 | 2.3 | 2.3 |
| | Total | 77.6 | 77.6 | 77.6 | 77.6 | 77.6 | 76.2 | 79.1 | 79.3 | 76.0 |
| substrate resin content ratio | core/shell type resin emulsion | 15% | 15% | 15% | 15% | 15% | 5% | 25% | 5% | 25% |
| | waterborne polyurethane resin | 55% | 55% | 55% | 55% | 55% | 65% | 45% | 55% | 55% |
| | waterborne polyester resin | 30% | 30% | 30% | 30% | 30% | 30% | 30% | 40% | 20% |
| {(melamine resin)/substrate resin} | | 40% | 40% | 40% | 40% | 40% | 40% | 40% | 40% | 40% |
| (pigment)/(resin) | | 0.07 | 0.07 | 0.07 | 0.07 | 0.07 | 0.07 | 0.07 | 0.07 | 0.07 |

TABLE 8

| Working Example Number | | 1 | 2 | 3 | 4 | 5 | 6 | 7 | 8 | 9 |
|---|---|---|---|---|---|---|---|---|---|---|
| waterborne intermediate-coat coating material | | PR-1 | PR-2 | PR-3 | PR-4 | PR-5 | PR-6 | PR-7 | PR-8 | PR-9 |
| core/shell type resin emulsion | | AU-1 | AU-2 | AU-3 | AU-4 | AU-5 | AU-1 | AU-1 | AU-1 | AU-1 |
| core/shell type resin emulsion | | | | | | | | | | |
| | waterborne polyurethane resin | PU-1 | PU-2 | PU-1 | PU-1 | PU-3 | PU-1 | PU-1 | PU-1 | PU-1 |
| | mass ratio of core portion/shell portion | 1.00 | 1.17 | 1.00 | 1.00 | 0.89 | 1.00 | 1.00 | 1.00 | 1.00 |
| acrylic resin (core portion) | hydroxyl value (mgKOH/g) | 20 | 28 | 11 | 20 | 20 | 20 | 20 | 20 | 20 |
| | acid value (mgKOH/g) | 5 | 5 | 5 | 5 | 9 | 5 | 5 | 5 | 5 |
| | glass transition temperature (° C.) | 50 | 50 | 90 | 10 | 50 | 50 | 50 | 50 | 50 |
| waterborne polyurethane resin (shell portion) | hydroxyl value (mgKOH/g) | 50 | 37 | 50 | 50 | 42 | 50 | 50 | 50 | 50 |
| | acid value (mgKOH/g) | 28 | 58 | 28 | 28 | 13 | 28 | 28 | 28 | 28 |
| | number average molecular weight | 4000 | 9000 | 4000 | 4000 | 2500 | 4000 | 4000 | 4000 | 4000 |
| (core/shell type resin emulsion)/(substrate resin) | | 15% | 15% | 15% | 15% | 15% | 5% | 25% | 5% | 25% |
| waterborne polyurethane resin/(substrate resin) | | 55% | 55% | 55% | 55% | 55% | 65% | 45% | 55% | 55% |
| waterborne polyester resin/(substrate resin) | | 30% | 30% | 30% | 30% | 30% | 30% | 30% | 40% | 20% |
| {(melamine resin)/(substrate resin)} | | 40% | 40% | 40% | 40% | 40% | 40% | 40% | 40% | 40% |
| waterborne basecoat coating material | | BC-1 | BC-2 | BC-3 | BC-4 | BC-5 | BC-6 | BC-7 | BC-8 | BC-9 |
| core/shell type resin emulsion | | AU-1 | AU-2 | AU-3 | AU-4 | AU-5 | AU-1 | AU-1 | AU-1 | AU-1 |
| clearcoat coating material | | CC-1 | CC-1 | CC-1 | CC-1 | CC-1 | CC-1 | CC-1 | CC-1 | CC-1 |
| coated film external appearance | | ◎ | ○ | ◎ | ◎ | ○ | ○ | ○ | ○ | ○ |
| chipping resistance | | ◎ | ◎ | ○ | ◎ | ◎ | ◎ | ○ | ○ | ◎ |
| coated film hardness | | ○ | ○ | ○ | ○ | ○ | ○ | ○ | ○ | ○ |

TABLE 9

| Comparative Example Number | | 1 | 2 | 3 | 4 | 5 | 6 | 7 |
|---|---|---|---|---|---|---|---|---|
| waterborne intermediate-coat coating material | | PR-10 | PR-11 | PR-12 | PR-13 | PR-14 | PR-15 | PR-16 |
| core/shell type resin emulsion | | | | | | | | |
| | waterborne polyurethane resin | PU-1 | PU-1 | PU-1 | PU-1 | PU-1 | PU-4 | PU-5 |
| | mass ratio of core portion/shell portion | 1.00 | 1.00 | 1.00 | 1.00 | 1.00 | 1.00 | 1.00 |
| acrylic resin (core portion) | hydroxyl value (mgKOH/g) | 9 | 35 | 20 | 20 | 20 | 20 | 20 |
| | acid value (mgKOH/g) | 5 | 5 | 12 | 5 | 5 | 5 | 5 |
| | glass transition temperature (° C.) | 50 | 50 | 50 | −5 | 101 | 50 | 50 |
| waterborne polyurethane resin (shell portion) | hydroxyl value (mgKOH/g) | 50 | 50 | 50 | 50 | 50 | 18 | 81 |
| | acid value (mgKOH/g) | 28 | 28 | 28 | 28 | 28 | 29 | 27 |
| | number average molecular weight | 4000 | 4000 | 4000 | 4000 | 4000 | 5300 | 2500 |
| (core/shell type resin emulsion)/(substrate resin) | | 15% | 15% | 15% | 15% | 15% | 15% | 15% |
| waterborne polyurethane resin/(substrate resin) | | 55% | 55% | 55% | 55% | 55% | 55% | 55% |
| waterborne polyester resin/(substrate resin) | | 30% | 30% | 30% | 30% | 30% | 30% | 30% |
| {(melamine resin)/(substrate resin)} | | 40% | 40% | 40% | 40% | 40% | 40% | 40% |
| waterborne basecoat coating material | | BC-1 | BC-1 | BC-1 | BC-1 | BC-1 | BC-1 | BC-1 |
| core/shell type resin emulsion | | AU-1 | AU-1 | AU-1 | AU-1 | AU-1 | AU-1 | AU-1 |
| clearcoat coating material | | CC-1 | CC-1 | CC-1 | CC-1 | CC-1 | CC-1 | CC-1 |
| coated film external appearance | | ◎ | X | X | ◎ | ○ | ○ | X |
| chipping resistance | | X | ◎ | ◎ | ◎ | X | X | ◎ |
| coated film hardness | | ○ | ○ | ○ | X | ○ | ○ | ○ |

TABLE 10

| Comparative Example Number | | 8 | 9 | 10 | 11 | 12 | 13 | 14 |
|---|---|---|---|---|---|---|---|---|
| waterborne intermediate-coat coating material | | PR-17 | PR-18 | PR-19 | PR-20 | PR-21 | PR-22 | PR-23 |
| core/shell type resin emulsion | | | | | | | | |
| | waterborne polyurethane resin | PU-6 | PU-7 | PU-8 | PU-9 | PU-1 | PU-1 | PU-1 |
| | mass ratio of core portion/shell portion | 1.00 | 1.00 | 1.00 | 1.00 | 1.32 | 0.75 | 1.00 |
| acrylic resin (core portion) | hydroxyl value (mgKOH/g) | 20 | 20 | 20 | 20 | 20 | 20 | 20 |
| | acid value (mgKOH/g) | 5 | 5 | 5 | 5 | 5 | 5 | 5 |
| | glass transition temperature (° C.) | 50 | 50 | 50 | 50 | 50 | 50 | 50 |
| waterborne polyurethane resin (shell portion) | hydroxyl value (mgKOH/g) | 50 | 50 | 57 | 23 | 50 | 50 | 50 |
| | acid value (mgKOH/g) | 6 | 65 | 28 | 28 | 28 | 28 | 28 |
| | number average molecular weight | 4700 | 4000 | 1900 | 11000 | 4000 | 4000 | 4000 |
| (core/shell type resin emulsion)/(substrate resin) | | 15% | 15% | 15% | 15% | 15% | 15% | 0% |
| waterborne polyurethane resin/(substrate resin) | | 55% | 55% | 55% | 55% | 55% | 55% | 65% |
| waterborne polyester resin/(substrate resin) | | 30% | 30% | 30% | 30% | 30% | 30% | 35% |
| {(melamine resin)/(substrate resin)} | | 40% | 40% | 40% | 40% | 40% | 40% | 40% |
| waterborne basecoat coating material | | BC-1 | BC-1 | BC-1 | BC-1 | BC-1 | BC-1 | BC-1 |

TABLE 10-continued

| Comparative Example Number | 8 | 9 | 10 | 11 | 12 | 13 | 14 |
|---|---|---|---|---|---|---|---|
| core/shell type resin emulsion | AU-1 | AU-1 | AU-1 | AU-1 | AU-1 | AU-1 | AU-1 |
| clearcoat coating material | CC-1 | CC-1 | CC-1 | CC-1 | CC-1 | CC-1 | CC-1 |
| coated film external appearance | X | X | X | X | X | X | X |
| chipping resistance | ◎ | ◎ | ◎ | ◎ | ◎ | ◎ | ◎ |
| coated film hardness | ○ | ○ | ○ | ○ | ○ | ○ | ○ |

TABLE 11

| Comparative Example Number | | 15 | 16 | 17 | 18 | 19 | 20 | 21 |
|---|---|---|---|---|---|---|---|---|
| waterborne intermediate-coat coating material | | PR-24 | PR-25 | PR-26 | PR-27 | PR-28 | PR-29 | PR-30 |
| core/shell type resin emulsion | | | | | | | | |
| waterborne polyurethane resin | | PU-1 | PU-1 | PU-1 | PU-1 | PU-1 | PU-1 | PU-1 |
| mass ratio of core portion/shell portion | | 1.00 | 1.00 | 1.00 | 1.00 | 1.00 | 1.00 | 1.00 |
| acrylic resin (core portion) | hydroxyl value (mgKOH/g) | 20 | 20 | 20 | 20 | 20 | 20 | 20 |
| | acid value (mgKOH/g) | 5 | 5 | 5 | 5 | 5 | 5 | 5 |
| | glass transition temperature (° C.) | 50 | 50 | 50 | 50 | 50 | 50 | 50 |
| waterborne poly-urethane resin (shell portion) | hydroxyl value (mgKOH/g) | 50 | 50 | 50 | 50 | 50 | 50 | 50 |
| | acid value (mgKOH/g) | 28 | 28 | 28 | 28 | 28 | 28 | 28 |
| | number average molecular weight | 4000 | 4000 | 4000 | 4000 | 4000 | 4000 | 4000 |
| (core/shell type resin emulsion)/(substrate resin) | | 30% | 20% | 10% | 20% | 10% | 15% | 15% |
| waterborne polyurethane resin/(substrate resin) | | 50% | 40% | 70% | 65% | 45% | 55% | 55% |
| waterborne polyester resin/(substrate resin) | | 20% | 40% | 20% | 15% | 45% | 30% | 30% |
| {(melamine resin)/(substrate resin)} | | 40% | 40% | 40% | 40% | 40% | 30% | 50% |
| waterborne basecoat coating material | | BC-1 | BC-1 | BC-1 | BC-1 | BC-1 | BC-1 | BC-1 |
| core/shell type resin emulsion | | AU-1 | AU-1 | AU-1 | AU-1 | AU-1 | AU-1 | AU-1 |
| clearcoat coating material | | CC-1 | CC-1 | CC-1 | CC-1 | CC-1 | CC-1 | CC-1 |
| coated film external appearance | | X | ◎ | ◎ | ◎ | ◎ | ◎ | ◎ |
| chipping resistance | | ◎ | X | ◎ | ◎ | X | ◎ | X |
| coated film hardness | | ○ | ○ | X | X | ○ | X | ○ |

The invention claimed is:

1. A multilayer coated film forming method comprising:

coating a waterborne intermediate-coat coating material onto an electrodeposited and hardened coated film to form an intermediate coat, coating a waterborne basecoat coating material onto the intermediate coat without performing flash-off following forming the intermediate coat to form a basecoat, coating a clearcoat coating material onto the basecoat to form a clearcoat, and simultaneously heating and hardening the intermediate coat, the basecoat, and the clearcoat, wherein the waterborne intermediate-coat coating material and the waterborne basecoat coating material comprise:

a core/shell resin emulsion (A) in which the core portion is an acrylic resin (A1) and the shell portion is a polyurethane resin (A2), a water-soluble or water-dispersible polyurethane resin (B), a water-soluble or water-dispersible polyester resin (C), and a melamine resin (D), wherein the hydroxyl value of the acrylic resin (A1) is 10-30 mgKOH/g, the acid value is 0-10 mgKOH/g, and the glass transition temperature is 0-100° C., the hydroxyl value of the polyurethane resin (A2) is 20-80 mgKOH/g, the acid value is 10-60 mgKOH/g, and the number average molecular weight is 2,000-10,000, the solids content mass ratio of component (A1) to component (A2) is 0.80-1.25, and, based on the combined resin solids content by mass of components (A) to (C), the solids content by mass of component (A) is 5-25 mass %, the solids content by mass of component (B) is 45-65 mass %, the solids content by mass of component (C) is 20-40 mass %, and the solids content by mass of component (D) is 35-45 mass %.

2. The multilayer coated film forming method of claim 1 wherein the clearcoat coating material comprises an acrylic resin and a polyisocyanate compound, wherein the acrylic resin has structural units (a) based on ε-caprolactone and structural units (b) based on radically-polymerizable monomer having a ring structure, and the amount of structural units (a) based on ε-caprolactone is at least 15 mass % of the acrylic resin solids content, and the amount of structural units (b) based on radically-polymerizable monomer having a ring structure is 50-100 mass % based on the structural units (a) based on ε-caprolactone.

3. A coated film obtained by the multilayer coated film forming method of claim 1.

4. A coated film obtained by the multilayer coated film forming method of claim 2.

* * * * *